Oct. 24, 1950 H. R. SCHEMM 2,527,488
APPARATUS FOR CONVEYING MATERIALS
Filed April 10, 1950 2 Sheets-Sheet 1
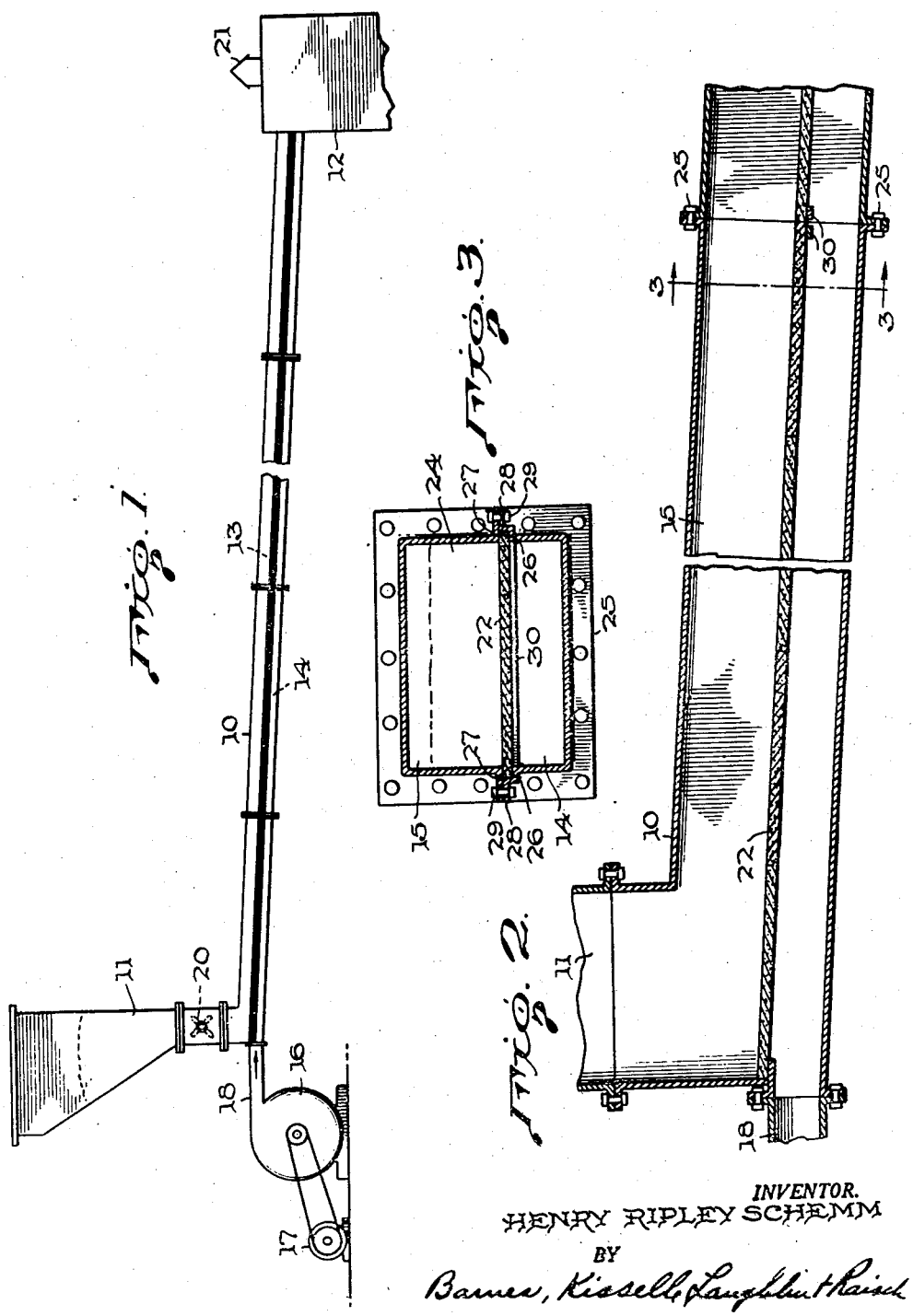
INVENTOR.
HENRY RIPLEY SCHEMM
BY
Barnes, Kissell, Laughlin & Raisch
ATTORNEYS

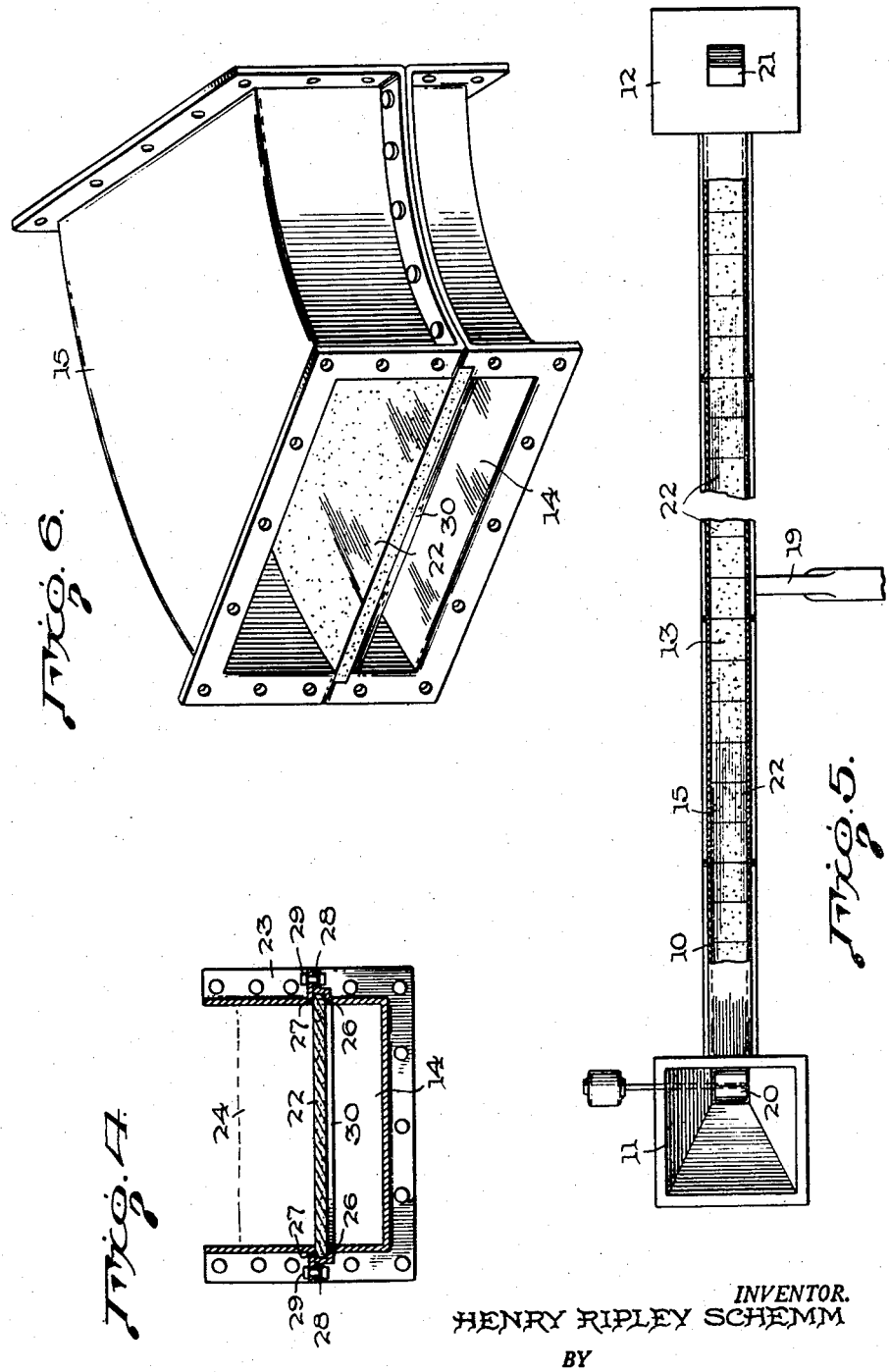

UNITED STATES PATENT OFFICE 2,527,488

APPARATUS FOR CONVEYING MATERIALS

Henry Ripley Schemm, Detroit, Mich., assignor to Huron Portland Cement Company, Detroit, Mich., a corporation of Michigan Application April 10, 1950, Serial No. 155,020

5 Claims. (Cl. 302—29)

This invention relates to an apparatus for conveying fine dry materials in an inclined path, and, more particularly, deals with an apparatus adapted for the conveyance, by gravitational force, of such materials while at elevated temperatures and while in a state of fluidity induced by the passage of a gas, such as air, through the material.

It has heretofore been proposed to convey finely-divided or pulverulent materials along the surface of a gas-permeable, rigid, porous medium through which air is introduced into the material. The prior proposals and installations have involved a generally horizontally disposed conduit or trough having a material inlet at one end and a material outlet at the other. The suggestion has been made that some inclination of the trough may, depending on the properties of the material, be desirable. The rigid porous medium heretofore used to support the material and cause air to be diffused into it is described as consisting of filter stone or porous brick. Such materials, having low resistance to airflow, are well known and are used extensively, not only for filtration of slurries and aeration of pulps such as sewage, but also in containers for dry pulverulent materials to aerate the dry solid and produce varying degrees of fluidization, particularly in the region of the container outlet.

The importance of proper control of airflow into the conveyed material has been stressed in published descriptions, the preferred method of control being to introduce greater amounts of air, per unit area of the porous medium, near the feed end of the conveyor than are used along the length of the conveyor in the direction of material movement. This type of control of the airflow into the material has been accomplished by several proposed expedients, such as the use of a tapered air chamber under the porous stone, or the use of a series of separate air compartments, each of which is fed by an individual air supply pipe, to attempt to admit progressively decreasing quantities of air into the successive compartments, from the feed end to the discharge end of the conveyor.

Devices of the type described have been used to a limited extent, and while operable to convey material when properly controlled and constructed, have been subject to many operating and maintenance difficulties. In the construction of the conveyor, elaborate installations to control the flow of air to different sections of the air duct have been found necessary to convey at commercially practical rates. If the control is achieved by compartmenting the air chamber below the gas-permeable surface, separate air supply lines to each compartment are required with the attendant valves and dampers or variations in line diameters, thus adding to the cost of installation and the complexity of operation. In those cases where the volume control of the air delivered to different sections of the conveyor is attempted by varying the cross sectional area of the air chamber, there is frequently insufficient latitude in control to permit desired changes in material feed rate or to handle variations in the properties of the material being conveyed. Furthermore, the air must be delivered to the feed end of the conveyor, which in many cases is not the most convenient location for the source of supply.

Further serious disadvantages have been experienced in the starting and stopping of the prior installations. Considerable care has been necessary in starting up an empty conveyor of the prior art to avoid plugging the material conduit when enclosed, or to prevent overflow of material when using an open trough. Perhaps the most serious of the operating difficulties experienced with such prior conveyors has been the residue of material left in the conveyor when the feed is stopped. In such prior practices it has been common to have an uneven bed of material remaining on the porous medium of the conveyor and varying in depth throughout the length of the conveyor from one to several inches in spite of the continued passage of air.

This residue produces two serious difficulties: (1) In a conveyor of commercial size, such a residue constitutes a substantial weight of material and in cases where different materials are handled alternately in the same conveyor, represents an amount of contaminant to the subsequent material which cannot be tolerated. Removal of the trough cover and manual cleaning has frequently been necessary in plant operation after each stoppage. (2) Furthermore, when such uneven but substantial residual beds are present, great difficulties are encountered in starting the conveyor without plugging or overflowing. Similar difficulties are encountered in starting following a stoppage caused by an interruption of the air supply. In short, in the conveyor of the prior art any area of the gas-permeable medium which has a thinner bed of material thereon than the remaining or any other area of the gas-permeable medium, or which may be free of material, usually causes a by-passing of the air through areas covered with a thin bed of material and the areas having thicker beds of material are starved for air and therefore uniform flow of material cannot be obtained.

The present invention comprehends an apparatus adapted for the conveying of dry pulverulent materials of fine particle size, and while at elevated temperatures, i. e. above about 300° F., which is not subject to the disadvantages of apparatus of the type referred to above and which will cause a uniformity of flow, and which has high capacity not heretofore attainable with conveying apparatus utilizing porous stones or bricks as the porous media to form the conveying surface.

More particularly, my invention comprises an apparatus having a porous or gas-permeable inclined conveying surface formed of rigid sections which have a relatively high uniform resistance to gas flow, and means preferably in the form of an air duct or plenum chamber below the inclined sections forming the conveying surface, for causing a gas to flow through such surface and into material thereon to aerate at least a portion of the material closest to the conveying surface, as a result of which the material will flow by gravity along the inclined conveying surface. The relatively high resistance to gas flow, conveniently expressed in terms of reduced permeability, results in the equal distribution of an appropriate gas, such as air, throughout the length and width of such an air duct or plenum chamber below the porous surface, thus assuring the passage of a uniform and controlled volume of air into the material. This low permeability permits a substantial pressure to be developed in the plenum chamber, even in the absence of material to be conveyed on any part of the conveying surface. In the apparatus of the invention the rigid porous members providing the gas-permeable surface have a permeability value not substantially greater than 6 and preferably not greater than 5, as defined specifically hereinafter. To give maximum results when installed, the conveying surface is inclined at an angle in excess of the angle of repose of the aerated material being conveyed.

My invention contemplates the use of a rigid, porous, gas-permeable material, such as exemplified by filter stones, porous bricks, porous porcelain, and the like, which has a gas-permeability not substantially exceeding 6, so that it has high resistance to the passage of gas. Such resistance assures an equal air distribution throughout the plenum chamber and a uniform flow into the material being conveyed, thereby restricting the total volume of air required to the minimum essential to conveying and avoiding any dust nuisance.

In the drawings:

Fig. 1 is a schematic elevation showing my apparatus for conveying material from a hopper to a bin;

Fig. 2 is an enlarged vertical section of the feed end portion of the conveyor of Fig. 1 showing the rigid gas-permeable medium;

Fig. 3 is a transverse section along the line 3—3 of Fig. 2;

Fig. 4 is a similar section of an alternative form of conveyor having a modified form of material confining means;

Fig. 5 is a top plan view of the conveyor of Fig. 1 having a modified air supply; and Fig. 6 is a perspetcive view of a curved unit of one form of my conveyor.

As an illustration of a typical conveyor in accordance with my invention I have shown a conveyor 10, with the central portion broken away, delivering material from a hopper 11 to a receiver 12. A gas-permeable medium 13 extends from the feed end to the discharge end of the conveyor and provides a material conveying surface which at the same time divides the conveyor casing into two portions, an air duct or plenum chamber 14 and a material confining conduit 15. The air is supplied by a fan 16, driven by motor 17, through an appropriate connection 18 to the plenum chamber 14. It is a feature of the invention that the air supply may be provided at any point along the length of the air duct, for example, as shown in Fig. 5 where the air supply connection 19 is made along the side of the conveyor. The material is fed onto the conveying surface near its upper end by feed control mechanism 20 which serves to regulate the amount of material placed in the conveyor in accordance with the desired capacity and the air supply employed. The material discharge end of the conveyor is here shown as connected to a bin 12 which is fitted with a vent 21. This vent serves to release to atmosphere the air which passes through the material being conveyed and flows along the top of the material confining member 15. In certain instances it will be desirable to place an air relief connection at some point along the top of the conveyor.

In the drawings sections of stones having a high resistance to the flow of gas are shown as the gas-permeable medium 22.

Fig. 4 illustrates a variation in which the confining walls 23 form an open trough for the conveyance of the material 24.

In practice it is found desirable to manufacture the conveyor in specific lengths, such as 10' lengths. In such a case each section is formed with appropriate flanges 25 to facilitate the assembly of several sections to form a continuous conveyor having a single air duct and an unbroken porous conveying surface. The sections of low gas-permeability stones forming the gas-permeable member 13 are supported at their side edges by shoulders 26 formed in the side walls of the air duct or plenum chamber 14. The stones or other rigid media are held in place on the shoulders by outwardly-extending flanges 27 at the bottom edges of the sides of the material-confining conduit 15 which overlie the side edges of the stones as well as flanges 28 extending outwardly from the shoulders 26. Bolts or other fastening means 29 pass through the flanges 27 and 28 and hold the material-confining conduit 15 in position on the plenum chamber 14. Cross support members 30 extend between the side walls of the plenum chamber at spaced intervals. They perform the dual function of tying the side walls of the plenum chamber together and providing transverse support for the porous gas-permeable medium 13 at spaced intervals.

The porous stones or other rigid media are cemented onto the shoulders 26 at their side edges and to one another where adjacent stones abut to ensure sealing against air leakage. Any suitable sealing compound may be used for this purpose. Such sealing may be done during the fabrication of sections to be assembled, or during installation, if the handling and shipping of assembled sections is liable to be such as to subject such assembled sections to torsional stresses or jarring as would be likely to break the sections of the rigid porous medium or the seal between the respective sections, or between the respective sections and the side walls of conveyor sections.

In the drawings the material-confining conduit 15 and the channels formed by the shoulders 26 which receive the edges of the rigid porous medium are shown as being of metal. If the material to be conveyed is at a temperature substantially above 800° F. the metal should be of such composition as to withstand such high temperature or a suitable refractory material should be used.

The rigid porous medium may be formed of any material which will produce the desired uniform and low gas permeability. Porous media made from bonded silica granules may be used under conditions where they will not be subjected to appreciable thermal shock, but I prefer a porous medium made from graded alumina particles ceramically bonded and kiln processed. Such media not only possess the desired uniform and low gas permeability but will withstand intense thermal shock without breakage or spalling.

One of the main disadvantages of stones heretofore used as a porous conveying medium has been their tendency to become clogged due to precipitation of dust, water and oil vapors in their pores, due, I believe, to their low resistance to the flow of air through them. I have have found that when the stones or other rigid porous media have a gas permeability below about 6 there is much less tendency for them to become clogged, apparently because with decreased gas permeability the velocity of the gas through the pores of the media is sufficient to prevent precipitation of particles entrained therein. When conveying material at elevated temperatures, precipitation of water and oil vapors also is avoided as the temperature of the porous medium forming the conveying surface will reach and be maintained at a temperature above the dew point of the water and oil vapors, so that any such vapors entrained in the air will pass through the porous medium without precipitation in the pores thereof. Consequently, any clogging effect which might be produced by any such entrained vapors, either alone or in combination with the material being conveyed, is avoided. This is particularly important where a material settable with water, like cement, is being conveyed and there is a substantial amount of moisture in the air used for aerating the cement on the conveying surface. When conveying such material along a rigid porous medium at a low temperature there is a tendency for moisture to condense in the pores of the porous medium or at its surface, which moisture will react with the cement or other similar material to form hydraulically set obstruction which plugs the pores physically as well as bonding with the individual grains of the porous medium.

Fig. 6 illustrates a special curved section of my conveyor in which an arcuate porous stone is the permeable material. The material in rounding the curve will often flow in the form of a deeper bed along the outside thereof, and in some cases, if the velocity is sufficiently great, will leave a portion of the porous medium on the inside of the curve substantially uncovered. In spite of this unequal distribution of material depth, my conveyor will continue to function with the desired uniformity of flow rate due to the low permeability of the porous medium.

In handling dry finely-divided materials of suitable particle size ranges, it is well known that the introduction of a gas in appropriate quantities into the material by diffusion will result in a marked change in properties, and that the gas-solids mixture will possess many of the properties of a liquid. Individual particles will be separated from each other, the bulk volume considerably expanded, and the internal particle-to-particle friction reduced to a minimum.

The diffusion of gas into such a material to produce this condition is one of the principal features of the present invention. The gas used under normal circumstances is air, but the terms "air" and "aeration," I use in a generic sense to refer to any appropriate gas. In certain special cases it may be desirable to employ an inert gas, a heated or refrigerated gas or mixture of gases, or a gas chemically reactive with respect to the material being conveyed. The use of such gases is within the scope of the term "aeration," which as used herein refers to the introduction of gas into and through the material in volume only sufficient to expand the body of material, without mechanically entraining the particles and removing them from the expanded body of material. Such mechanical entrainment, which in reality is a form of pneumatic conveying, is avoided in the conveyor of the invention since it creates a dust collection problem, wastes power and decreases the efficiency of the conveyor. As described more completely below, it is frequently not necessary to effect complete aeration of the entire bed of material, but only the portion directly above the porous medium.

There are a number of variable factors in the design of the conveyor which should be considered and properly integrated to permit an operation of maximum efficiency and capacity. The more important of these are:

*Material conveyed.*—Specific gravity, particle size and shape, surface properties, percentage moisture, and angle of repose when aerated;

*Conveyor installation and structure.*—Material feed control means, air venting means, and permissible or necessary slope;

*Rigid gas-permeable medium.*—Structure (i. e. size, shape and distribution of air passages), and resistance to gas flow (permeability);

*Operation of conveyor.*—Airflow (cu. ft. per minute per sq. ft. of effective area), air duct pressure (inches of water), depth of moving bed, and density of moving material (a measure of the degree of aeration), which features have a marked effect on the rate of conveyance of a given material.

Illustrative of the wide variety of materials which may be successfully conveyed in accordance with the invention when in a finely-divided, dry state are the following:

Portland cement of various types, mortar and special cements, cement raw materials and mixtures, limestone, dolomite, magnesite, silica, clays including bentonite, barites, gypsum, cryolite, bauxite, phosphate rock and apatite, iron ore, talc, coal, quicklime, hydrated lime, magnesia, alumina, soda ash, sodium phosphates, litharge, anhydrite, ammonium sulphate, fly ash, furnace and kiln flue dusts, bulk resins and plastics, sugar, and farinaceous materials such as bread and cake flours.

The apparatus of the invention is applicable to the conveyance of these materials only if their properties are such as to permit the attainment of a fluent condition when aerated. Perhaps the most important property in this respect is particle shape and size, and particularly the range of particle size. Generally speaking, materials should be finer than 20 mesh and preferably finer than about 65 mesh, and at the same time contain a substantial proportion of minus 100 mesh, and with some materials preferably at least 30% by weight of minus 200 mesh, particles. Relatively small amounts of plus 20 mesh particles or agglomerated lumps may be conveyed, provided the remainder has an appropriate size range. As is well known, a material containing particles all of which are substantially the same size is difficult to fluidize or aerate and will not be conveyed efficiently. It is desirable for best results to have a substantial spread in size range of the particles. In very fine materials such as pigments, where the particle size is in the low micron range, surface properties become important. Some such materials tend to agglomerate and cannot be made fluent by the introduction of a gas. The specific gravity of the material is not important except as it affects, in combination with the particle size range, the aerated bulk density of the material. The shape of the particle is sometimes important, flat plates or needles, for example, being very difficult if not impossible to aerate effectively.

The permissible moisture, where the materials are not at an elevated temperature, is entirely dependent on the particular material, some substances requiring less than 3% moisture for satisfactory fluidization while others will fluidize with moisture contents up to 12%.

Material of a given composition and fineness has a specific angle of repose when unaerated and I have found that such material when thoroughly aerated has a specific and constant angle of repose substantially less than the aforesaid angle of repose. By "thoroughly aerated" I mean the introduction into the material of a maximum quantity of air permissible without entraining any substantial amount of the fine particles and removing them from the fluidized body of material. The angle may be measured by placing a quantity of material on a horizontal gas-permeable surface and passing air into and through the material. As it becomes aerated, it will spread upon the surface until its profile assumes a specific angle from the horizontal. After this constant angle has been reached, there will be no further movement of the material across the horizontal surface regardless of the time of aeration. The angle of repose of the fully aerated material is thus a measure of the internal particle-to-particle friction of the material and the frictional resistance of the permeable surface. When tested on gas-permeable surfaces used in my invention, the surface friction effect is small, and the angle of repose may be said to be a measure of the force or "head" required to overcome the particle friction of the aerated material.

When the gas-permeable surface on which the angle of repose is measured is given an inclination equal to the angle of repose of the material, the aerated material will slowly flow down the slope and off the inclined surface leaving a relatively small residue. When the slope is increased above the angle of repose, the velocity of the material flow is increased and a negligible residue is left on the surface. Any increase in the slope above the angle of repose produces a beneficial result. In the method of my invention, I, therefore, prefer to incline the porous conveying surface at least at an angle slightly in excess of the angle of repose of the aerated material to be conveyed and at most at an angle equal to the angle of repose of the unaerated material. In plant practice the slope of my conveyor will be dictated by the headroom available. If such a minimum angle is not utilized, material flow can be achieved through a relatively short length of conveyor by providing a head of material at the feed end and by having the side walls of the conveyor sufficiently high to contain the depth of bed necessary to produce such head. The conveyor will not, however, be self-cleaning. A conveyor having a normally desired commercial length and side wall height will not permit a sufficiently deep bed of material near the feed end to produce the necessary head required to move the material. I have found that the angles of repose vary from about 2° to as much as 6.5° depending on the material tested or upon the fineness. As an example, ordinary Type I Portland cement has an angle of repose approximating 2.5° whereas the more finely ground high early strength cement will frequently have angles of repose up to 5° depending on the fineness of the sample.

The resistance to the passage of air through a porous medium may conveniently be expressed in terms of air volume passing at a specified pressure drop across the medium.

Illustrative of this method of expression is the use of the term "permeability," which represents the capacity of a porous medium to pass air under a given set of conditions and which is widely used by the manufacturers of porous stone blocks of the type commonly used in the treatment of sewage by the "activated sludge process." The accepted definition of the term is: "The amount of air measured in cubic feet and at 70° F. and 25% relative humidity which will pass through the area of one square foot of dry porous stone in one minute when tested under an equivalent pressure differential of two inches of water."

It will be understood that the "permeability" of a material is not synonymous with nor directly related to the "porosity" of the material. "Porosity" is defined as the percent ratio of pore space, by volume, to the bulk volume of the material. Thus, media having identical "porosities" may have widely differing "permeabilities" due to variations in the diameter and number of pores. In the fabrication of suitable porous media for use in the method of the invention, it is important that a uniform distribution of the air passages through the medium be achieved in order that the introduction of air into the conveyed material will be as uniform as possible.

I have found that porous media effective to produce satisfactory conveyance of finely-divided materials must have a relatively high resistance to airflow at low pressures. The porous rigid media which I employ in accordance with my invention are always gas-permeable and have permeabilities of substantially (i. e. about) 6 as a top limit, determined in accordance with the above definition (c. f. m./sq. ft. at 2 inches w. g.). I have found by extensive experimentation that as the permeability increases above about 6, the effectiveness and utility of media decrease rapidly, and I have found such media, if they have relatively low resistance to the passage of gas, like the filter stone and porous brick heretofore used, to be unsatisfactory in practical commercial applications.

It is to be understood that the definition of the porous medium of the present invention in terms of permeability does not imply that a pressure as low as two inches of water is necessarily used in actual operation.

A further feature of the invention is the relatively high resistance to airflow of the porous medium compared to that of the bed of material. Successful operation of my air activated gravity conveyor may thus be said to be dependent on the use of a porous medium having a pressure differential under operating gas volume flow, which is substantial compared to the pressure drop across (i. e. through) the bed of material being conveyed. In the previously described conveyors of the prior art this has not been the case, the pressure drop across the load being high compared to the pressure drop across the porous medium, and as a result, a variation in depth of bed has an immediate and substantial effect on the quantity of air flowing through the porous medium at that point. Conversely, the use of a medium having a low permeability and thus a relatively high resistance to the flow of the desired volume of air, compared to the resistance of the bed of material results in a uniform aeration of the material, and the maintenance of equal pressures through the entire length of the air duct. The effect of differences in bed depth within the range of normal conveying depths, i. e. 2 to 4 inches, on conveyor performance is thus not critical. It is for this reason, that in operation of my conveying apparatus an increased depth of material at the feed end of the conveyor does not cause short-circuiting of the air farther along the conveyor with consequent plugging or overflow. Furthermore, when the feed is stopped, the conveyor will empty almost completely because there is no great increase in the amount of air passing the uncovered feed end at the expense of the discharge end which continues to support a flowing bed of material until completion of discharge. Conveyors made in accordance with the invention will empty leaving a residue of only ⅛ inch of aerated material. It will thus be apparent that local temporary changes in depth of material do not cause undesirable results.

The following table serves to illustrate the pressure differential ($dP$) relationships. In each instance the rigid porous medium had a gas permeability of 4.1, and 4 cu. ft. per min. of air per sq. ft. of rigid porous medium was used. The $dP$ is indicated in inches of water.

| Material | $dP$ Porous Medium Empty | $dP$ 2″ Unaerated Material | Ratio $dP$ Material to $dP$ Porous Medium |
|---|---|---|---|
| | | Inches | |
| Cement Raw Material Mix | 2.2 | 1.70 | 0.77 |
| Portland Cement | 2.2 | 1.95 | 0.89 |
| Bread Flour | 2.2 | 0.70 | 0.32 |
| Alumina "A-1" | 2.2 | 1.50 | 0.68 |

The rigid porous medium should have a sufficiently high resistance to the passage of gas that the pressure differential across it when not covered is equal to at least 1½ inches of water.

In carrying out my invention I employ rigid porous media having a relatively high resistance to flow of air as the porous medium for introducing gas into the material being conveyed. The use of such a material having a relatively low permeability, i. e. below about 6 and with particular advantage below about 2, gives rise to many important and unexpected advantages as compared to a medium such as porous stones having relatively little resistance to the passage of gas therethrough.

It is desirable in most instances to control and limit the rate of feed into the conveyor by a conventional feeder 20 so that it will not exceed the rate of free flow by gravity of the material through the conveyor. When using minimum quantities of air to cause material movement in a conveyor of the type shown in Fig. 3, the introduction of excessive quantities of material may tend to plug the conveyor by forcing material against the top of the duct. This condition may usually be overcome or prevented by the use of somewhat increased quantities of aeration gas.

In my copending application Serial No. 144,910, filed February 18, 1950, I have disclosed and claimed a conveying apparatus similar to that described herein, except that the porous medium is a flexible fabric of low gas-permeability. For the conveying of materials at relatively low temperatures the use of a tightly woven flexible fabric of low gas-permeability is to be preferred for reasons set forth in that application. However, textile fabrics ordinarily are not suitable for the continuous handling of materials having a temperature above about 300° F., as when conveying materials above about that temperature the fabric conveying surface even though cooled to some extent by the gases passing therethrough will attain a temperature at which charring or other deterioration will take place. Specifically, porous media of textile fabrics are not suitable where flue ash, fly ash, dust from electrostatic precipitators, and other materials at temperatures above about 300° F. and which may be as high as from 600° F. to 800° F., or higher, are to be conveyed. In such cases the use of porous stone, porous porcelain or other porous materials which will withstand such temperatures without deterioration are not only to be preferred, but are necessary.

While the conveying apparatus of the invention is particularly adapted for conveying finely-divided material at temperatures above those which can be conveyed on porous media of textile fabric, it is to be understood that the invention is not limited to conveying hot material, and the rigid porous medium may be used for conveying material at any temperature.

This application is a continuation-in-part of my copending applications Serial No. 602,004, filed June 28, 1945, now abandoned, Serial No. 717,913, filed December 23, 1946, Serial No. 51,224, filed September 25, 1948, and Serial No. 144,910, filed February 18, 1950.

I claim:

1. An apparatus adapted for conveying finely-divided substantially dry hot material comprising a rigid porous medium of substantially uniform gas-permeability having a surface along which the material is adapted to flow when aerated, and means for causing a gas to flow through the porous medium from the side opposite that along which the material is adapted to flow, said porous medium having a gas-permeability not substantially exceeding 6.

2. An apparatus adapted for conveying finely-divided substantially dry hot material comprising a rigid porous medium of substantially uniform gas-permeability having a surface along which the material is adapted to flow when aerated, said porous medium having a gas-permeability not substantially exceeding 6 and forming at least a portion of one side of a duct into which air is to be forced for passage through the porous medium to aerate finely-divided material on said conveying surface.

3. An apparatus as defined in claim 2 having means extending along opposite side edges of the conveying surface and with said porous medium forming a trough for material to be conveyed along said surface.

4. An apparatus as defined in claim 3 having means for feeding material at a substantially uniform rate onto one end portion of the conveying surface.

5. An apparatus adapted for conveying finely-divided substantially dry hot material comprising a casing, a rigid porous medium of substantially uniform gas-permeability extending transversely across said casing and dividing it into a material-confining duct and a duct through which air is adapted to be forced to pass through the porous medium into finely-divided material on the porous medium in the material-confining duct, said porous medium having a gas-permeability not substantially exceeding 6.

HENRY RIPLEY SCHEMM.

REFERENCES CITED

The following references are of record in the file of this patent:

UNITED STATES PATENTS

| Number | Name | Date |
|---|---|---|
| 1,971,853 | Ihlefeldt | Aug. 28, 1934 |
| 2,219,283 | Horn | Oct. 29, 1940 |
| 2,316,814 | Schemm | Apr. 20, 1943 |

FOREIGN PATENTS

| Number | Country | Date |
|---|---|---|
| 419,703 | Great Britain | Nov. 16, 1934 |